United States Patent
Li et al.

(10) Patent No.: US 12,027,134 B2
(45) Date of Patent: Jul. 2, 2024

(54) DISPLAY PANEL, DISPLAY DEVICE AND DEBUGGING METHOD THEREOF

(71) Applicants: Beijing BOE Display Technology Co., Ltd., Beijing (CN); BOE Technology Group Co., Ltd., Beijing (CN)

(72) Inventors: Shou Li, Beijing (CN); Xingliang Li, Beijing (CN); Liugang Zhou, Beijing (CN); Jian Zhang, Beijing (CN); Zhanchang Bu, Beijing (CN); Hui Zhang, Beijing (CN); Hongli Yue, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/768,828

(22) PCT Filed: Apr. 20, 2021

(86) PCT No.: PCT/CN2021/088534
§ 371 (c)(1),
(2) Date: Apr. 13, 2022

(87) PCT Pub. No.: WO2022/222050
PCT Pub. Date: Oct. 27, 2022

(65) Prior Publication Data
US 2024/0105140 A1 Mar. 28, 2024

(51) Int. Cl.
*G09G 3/36* (2006.01)
*G02F 1/1335* (2006.01)
*G02F 1/1362* (2006.01)

(52) U.S. Cl.
CPC ..... *G09G 3/3696* (2013.01); *G02F 1/133512* (2013.01); *G02F 1/133514* (2013.01); *G02F 1/136286* (2013.01)

(58) Field of Classification Search
CPC .................................................... G09G 3/3696
See application file for complete search history.

(56) References Cited

U.S. PATENT DOCUMENTS

| 2014/0210841 A1 | 7/2014 | Song et al. |
| 2017/0097538 A1 | 4/2017 | Cho et al. |

(Continued)

FOREIGN PATENT DOCUMENTS

| CN | 101191924 A | 6/2008 |
| CN | 102231016 A | 11/2011 |

(Continued)

OTHER PUBLICATIONS

Song CN107843998 (A) Mar. 27, 2018 machine translation (Year: 2024).*

*Primary Examiner* — Gustavo Polo
(74) *Attorney, Agent, or Firm* — IPro, PLLC

(57) ABSTRACT

A display panel (20), a display device and a debugging method thereof are provided. The display panel (20) includes: a base substrate (1), including a display region (A) and a non-display region (B) surrounding the display region (A), the non-display region (B) including a binding region (C) located on one side of the display region (A); and a plurality of sub-pixels (2), located in the display region (A). Areas of pixel aperture regions of the plurality of sub-pixels (2) tend to increase in a direction from the binding region (C) to the display region (A).

15 Claims, 7 Drawing Sheets

(56) References Cited

U.S. PATENT DOCUMENTS

| | | | |
|---|---|---|---|
| 2019/0137803 A1 | 5/2019 | Xing et al. | |
| 2020/0050063 A1* | 2/2020 | Yoshida | G02F 1/134336 |
| 2022/0231055 A1* | 7/2022 | Qin | G09G 3/20 |

FOREIGN PATENT DOCUMENTS

| | | |
|---|---|---|
| CN | 102621756 A | 8/2012 |
| CN | 202649645 U | 1/2013 |
| CN | 107037658 A | 8/2017 |
| CN | 107481686 A | 12/2017 |
| CN | 107703686 A | 2/2018 |
| CN | 107843998 A | 3/2018 |
| KR | 20080051231 A | 6/2008 |

\* cited by examiner

-- Prior Art --

-- Prior Art --

## DISPLAY PANEL, DISPLAY DEVICE AND DEBUGGING METHOD THEREOF

CROSS REFERENCE TO RELATED APPLICATIONS

The present application is a national phase entry under 35 U.S.C. § 371 of International Application No. PCT/CN2021/088534, filed on Apr. 20, 2021.

FIELD

The present disclosure relates to the technical field of display, in particular to a display panel, a display device and a debugging method thereof.

BACKGROUND

Existing large-sized display devices, at higher resolutions and higher refresh rates, tend to suffer from insufficient pixel charging due to differences in resistance-capacitance loading (RC loading), manifested as bright at the near end and dark at the far end of panel display, and the picture uniformity is poor. How to improve picture uniformity becomes an urgent technical problem to be solved.

SUMMARY

The present disclosure provides a display panel, a display device and a debugging method thereof. The specific solutions are as follows.

Embodiments of the present disclosure provide a display panel, including:
   a base substrate, including a display region and a non-display region surrounding the display region, the non-display region including a binding region located on one side of the display region; and
   a plurality of sub-pixels, located in the display region, areas of pixel aperture regions of the plurality of sub-pixels tending to increase in a direction from the binding region to the display region.

Optionally, in the embodiments of the present disclosure, a region occupied by each sub-pixel includes the pixel aperture region and a light-shielding region surrounding the pixel aperture region. Areas of the regions occupied by the sub-pixels are the same. A color filter is disposed in each pixel aperture region, and a light-shielding part is disposed in each light-shielding region. In the direction from the binding region to the display region, widths of the light-shielding parts of the sub-pixels tend to decrease.

Optionally, in the embodiments of the present disclosure, the display region includes data lines and gate lines disposed crosswise.

The binding region is disposed on one side of an extending direction of the data lines. Widths of portions, for shielding the gate lines, in the light-shielding parts in the extending direction of the data lines tend to decrease.

Optionally, in the embodiments of the present disclosure, the display region includes data lines and gate lines disposed crosswise.

The binding region is disposed on one side of an extending direction of the gate lines. Widths of portions, for shielding the data lines, in the light-shielding parts in the extending direction of the gate lines tend to decrease.

Optionally, in the embodiments of the present disclosure, in a direction perpendicular to the direction from the binding region to the display region, widths of the light-shielding parts of the sub-pixels are the same.

Optionally, in the embodiments of the present disclosure, the display region is divided into a plurality of sub-display regions in a direction of the binding region facing away from the display region. Areas of pixel aperture regions of sub-pixels in the same sub-display region are the same. Areas of pixel aperture regions in different sub-display regions gradually increase in the direction from the binding region to the display region.

Optionally, in the embodiments of the present disclosure, the display region is divided into a plurality of sub-display regions in a direction of the binding region facing away from the display region. Areas of pixel aperture regions of sub-pixels in the same sub-display region gradually increase in the direction from the binding region to the display region.

Correspondingly, embodiments of the present disclosure provide a display device, including:
   a backlight module; and
   the display panel according to any one of the above.

The display panel is located on a light-emitting side of the backlight module.

Correspondingly, embodiments of the present disclosure provide a debugging method of the above display device, including:
   inputting a pure color picture to the display panel; and
   loading driving voltages tending to increase to regions, corresponding to the sub-pixels in the display region, of the backlight module in the direction from the binding region to the display region, such that a brightness difference between the sub-pixels can be less than a preset threshold.

Optionally, in the embodiments of the present disclosure, the display region is divided into a plurality of sub-display regions in a direction of the binding region facing away from the display region.

The loading the driving voltages tending to increase to the regions, corresponding to the sub-pixels in the display region, of the backlight module in the direction from the binding region to the display region, includes:
   loading gradually increasing driving voltages to regions, corresponding to the sub-display regions, of the backlight module in the direction from the binding region to the display region.

Driving voltages loaded to regions, corresponding to the same sub-display region, of the backlight module are the same.

DETAILED DESCRIPTION OF THE EMBODIMENTS

Figure 1:
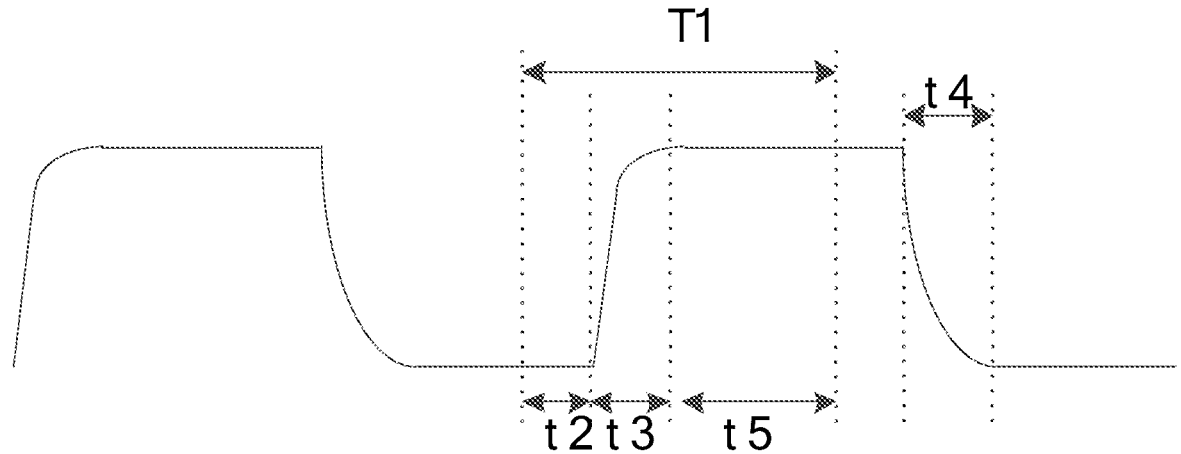
FIG. 1 is a schematic diagram of charging simulation of a display near end in the related art.

In order to make the objectives, technical solutions, and advantages of embodiments of the present disclosure clearer, the technical solutions of the embodiments of the present disclosure will be described clearly and completely with reference to accompanying drawings of the embodiments of the present disclosure. Obviously, the described embodiments are part of, rather than all of, embodiments of the present disclosure. In addition, the embodiments of the present disclosure and features of the embodiments may be combined with each other without conflict. Based on the described embodiments of the present disclosure, all other embodiments obtained by those ordinarily skilled in the art without creative labor fall within the protection scope of the present disclosure.

Unless otherwise defined, technical or scientific terms used in the present disclosure shall have the ordinary meanings as understood by those with ordinary skills in the art to which the present disclosure belongs. "Comprise" or "include" or other similar words used in the present disclosure mean that the element or item appearing before the word encompasses the element or item listed after the word and its equivalents, but does not exclude other elements or items.

It should be noted that the dimensions and shapes of the figures in the accompanying drawings do not reflect the real scale, and are only intended to illustrate the present disclosure. In addition, the same or similar reference numerals refer to the same or similar elements or elements having the same or similar functions throughout.

Figure 2:
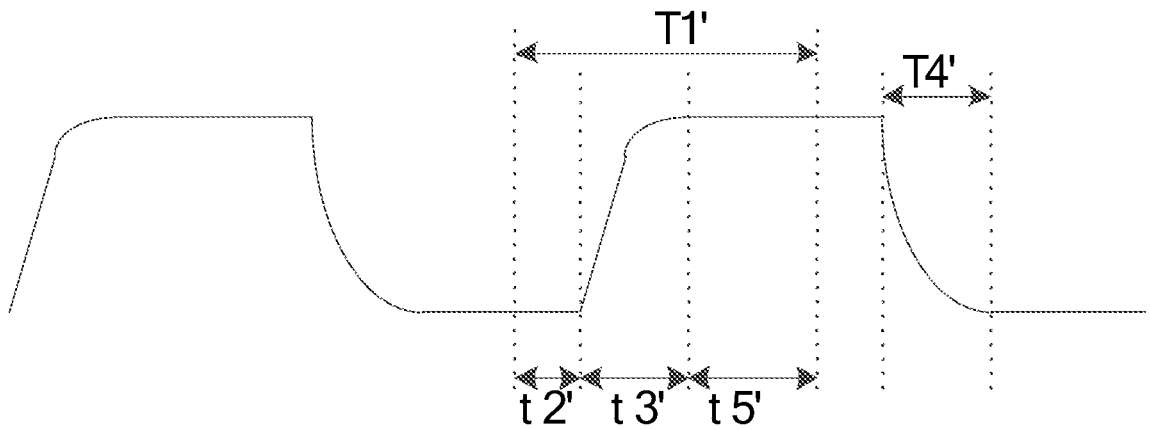
FIG. 2 is a schematic diagram of charging simulation of a display far end in the related art.

In the prior art, especially for a large-sized display device, such as a television (TV) ranging from 65 inches to 110 inches, the inventors determine the impedance, capacitive reactance and other data of data transmission lines at different positions of a display screen based on its relevant parameters, such as the type of wiring metal, wiring metal line width, mask process conditions, etc. By simulating the pixel charging rate, mainly including the pixel charging rise time, fall time, the effective charging time is finally determined, the relationship between the pixel charging rate and the position coordinates of the display screen is determined, and the relationship between the display brightness and the position coordinates of the screen is determined according to the pixel transmittance and other data. Combined with FIG. 1 and FIG. 2, FIG. 1 is a schematic diagram of charging simulation of a display near end, and FIG. 2 is a schematic diagram of charging simulation of a display far end. As shown in FIG. 1, the display near end is short in wiring, small in impedance, and low in coupling capacitance and load. Based on the relationship between the signal transmission delay time and the impedance and capacitive reactance: $t=RC$, where t represents the signal transmission delay time, R represents the impedance, and C represents the capacitive reactance, it can be seen that in the display near-end, a data transmission rising duration t3 is shorter than a falling duration t4, and a charging duration t5 is longer. As shown in FIG. 2, the display far-end is long in wiring, high in impedance, and high in coupling capacitance and load, the signal transmission delay time is long, and a data transmission rising duration t3' and a falling duration t4' are both longer than those at the display near-end, t3'>t3, t4'>t4. When a data transmission period is constant, that is, T1=T1', t2=t2', it can be seen that t5'<t5, that is, compared with the display near-end, the display far-end has a shorter charging duration, and pixels are insufficiently charged, manifested as, in terms of a display effect, bright in the display near-end, dark in the display far-end, and poor in picture uniformity.

In view of this, embodiments of the present disclosure provide a display panel, a display device, and a debugging method thereof, for avoiding uneven charging caused by a resistance-capacitance loading (RC loading) difference between a far-end and a near-end of the panel, and ensuring the picture uniformity.

Figure 3:
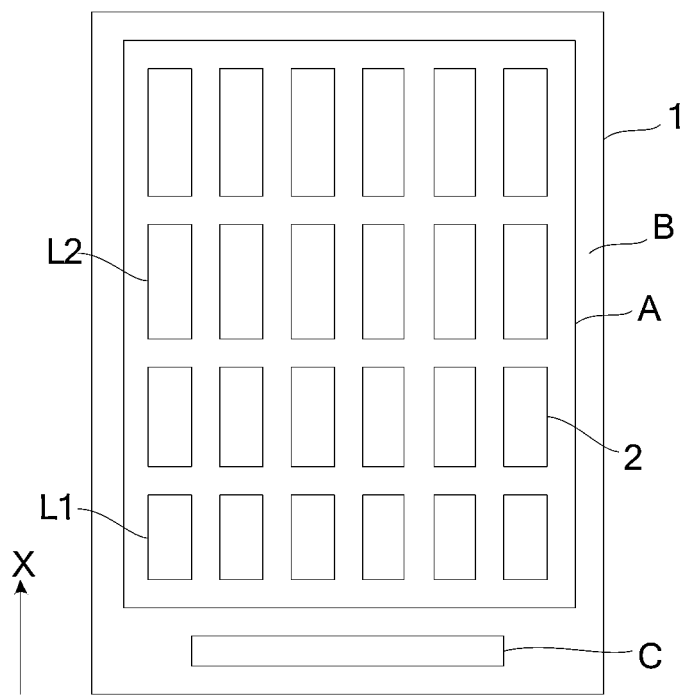
FIG. 3 is a structural schematic diagram of a display panel according to an embodiment of the present disclosure.

FIG. 3 is a schematic structural diagram of a display panel provided by an embodiment of the present disclosure. The display panel includes:
- a base substrate 1, including a display region A and a non-display region B surrounding the display region A, the non-display region B including a binding region C located on one side of the display region A; and
- a plurality of sub-pixels 2, located in the display region A.

Areas of pixel aperture regions of the plurality of sub-pixels 2 tend to increase in a direction from the binding region C to the display region A.

Figure 4:
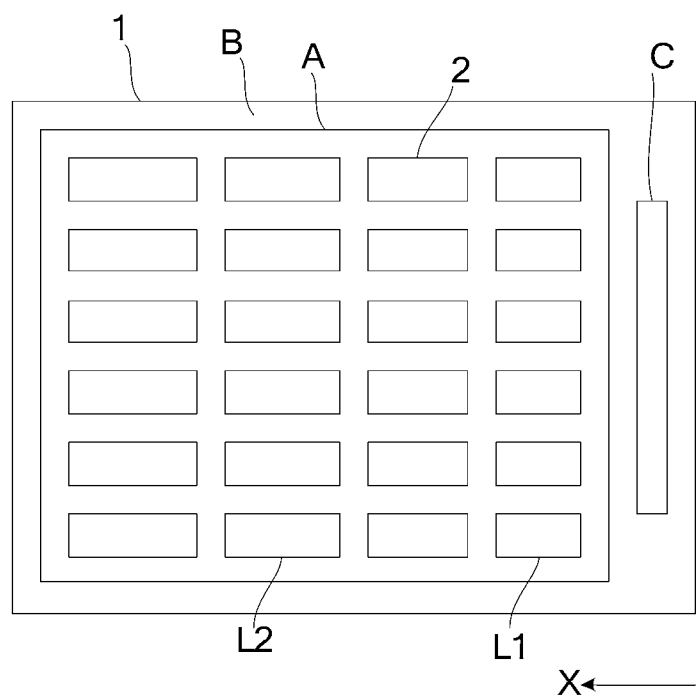
FIG. 4 is a structural schematic diagram of a display panel according to an embodiment of the present disclosure.

In the embodiments of the present disclosure, the base substrate 1 may be a glass-based substrate, a silicon-based substrate, or a flexible substrate, etc., which is not limited here. The base substrate 1 includes the display region A and the non-display region B surrounding the display region A. The non-display region B includes the binding region C located on one side of the display region A. One of the schematic distribution diagrams of the display region A, the non-display region B and the binding region C may be as shown in FIG. 3 or as shown in FIG. 4. Of course, the distribution of the display region A, the non-display region B, and the binding region C may be set according to actual application needs, which will not be described in detail here.

Furthermore, the display panel includes the plurality of sub-pixels 2 located in the display region A. The plurality of sub-pixels 2 are arranged in an array on the base substrate 1. The quantity of the plurality of sub-pixels 2 may be set according to the specific size, pixel resolution, and size of a single sub-pixel of the display panel in practical applications, which is not limited here.

Still referring to FIG. 3, the areas of the pixel aperture regions of the plurality of sub-pixels 2 tending to increase in the direction from the binding region C to the display region A may be that the areas of the pixel aperture regions of the plurality of sub-pixels 2 tend to gradually increase line by line, or the areas of the pixel aperture regions of the plurality of sub-pixels 2 tend to partially increase, or the areas of the pixel aperture regions of the plurality of sub-pixels 2 tend to increase according to regions of the plurality of sub-pixels 2 divided in the direction from the binding region C to the display region A, which is not limited here. A direction indicated by an arrow X is the direction from the binding region C to the display region A. Taking the areas of the pixel aperture regions of the plurality of sub-pixels 2 tending to gradually increase line by line as an example, for example, a distance between sub-pixels in a row L1 and the binding region C is h1, an area of pixel aperture regions of the sub-pixels in the row L1 is s1, a distance between sub-pixels in a row L2 and the binding region C is h2, and areas of pixel aperture regions of the sub-pixels in the row L2 is s2, where h1<h2, and s1<s2. In this way, the larger the areas of the pixel aperture regions of the sub-pixels, farther away from the binding region C, in the display region A, the higher the pixel transmittance at the corresponding positions, which correspondingly weakens the negative effect of large resistance-capacitance loading at the corresponding positions on picture uniformity, and ensures the picture uniformity of the display panel.

Figure 5:
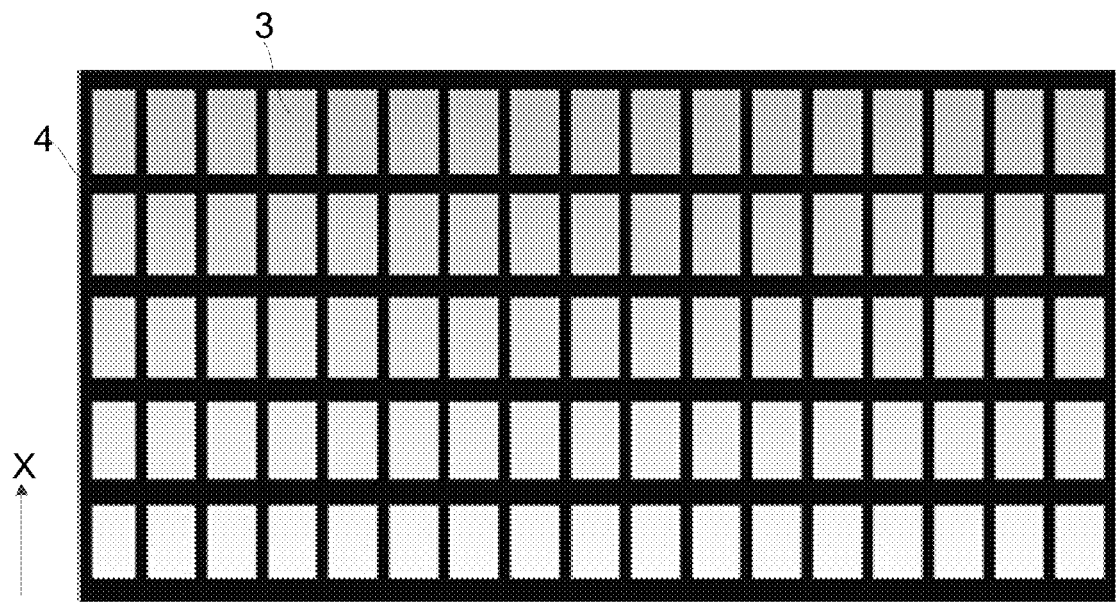
FIG. 5 is a schematic structural diagram of a display panel according to an embodiment of the present disclosure.

In the embodiments of the present disclosure, FIG. 5 is one of the structural schematic diagrams of the display panel. A region occupied by each sub-pixel includes the pixel aperture region and a light-shielding region surrounding the pixel aperture region. The regions occupied by the sub-pixels have the same area. A color filter 3 is disposed in each pixel aperture region, and a light-shielding part 4 is disposed in each light-shielding region. In the direction from the binding region C to the display region A, a width of the light-shielding part 4 of each sub-pixel tends to decrease.

In the implementation process, the color filter 3 may include a red color filter, a blue color filter and a green color filter, and the color filter 3 may also include a red color filter, a blue color filter, a green color filter and a white color filter. Therefore, color mixing among various colors of the display panel is realized, and the display quality is ensured. In applications, the color filter 3 may be set according to actual needs, which will not be described in detail here. In addition, the light-shielding parts 4 located in the light-shielding regions may be black matrixes, which effectively avoids light mixing between two adjacent sub-pixels and ensures the display quality.

Moreover, in the direction from the binding region C to the display region A, the width of the light-shielding part 4 of each sub-pixel tends to decrease. It may be that the width of the light-shielding part 4 of each sub-pixel tends to gradually decrease line by line, or the width of the light-shielding part 4 of each sub-pixel tends to partially decrease, or the width of the light-shielding part 4 of each sub-pixel tends to decrease according to regions divided in the direction from the binding region C to the display region A, which is not limited here. In this way, when the areas occupied by the sub-pixels are the same, in the direction from the binding region C to the display region A, the area of the pixel aperture region of each sub-pixel tends to increase. As a result, the larger the areas of the pixel aperture regions of the sub-pixels, farther away from the binding region C, in the display region A, the higher the pixel transmittance at the corresponding positions, which correspondingly weakens the negative effect of large resistance-capacitance loading at the corresponding positions on picture uniformity, and ensures the picture uniformity of the display panel.

Figure 6:
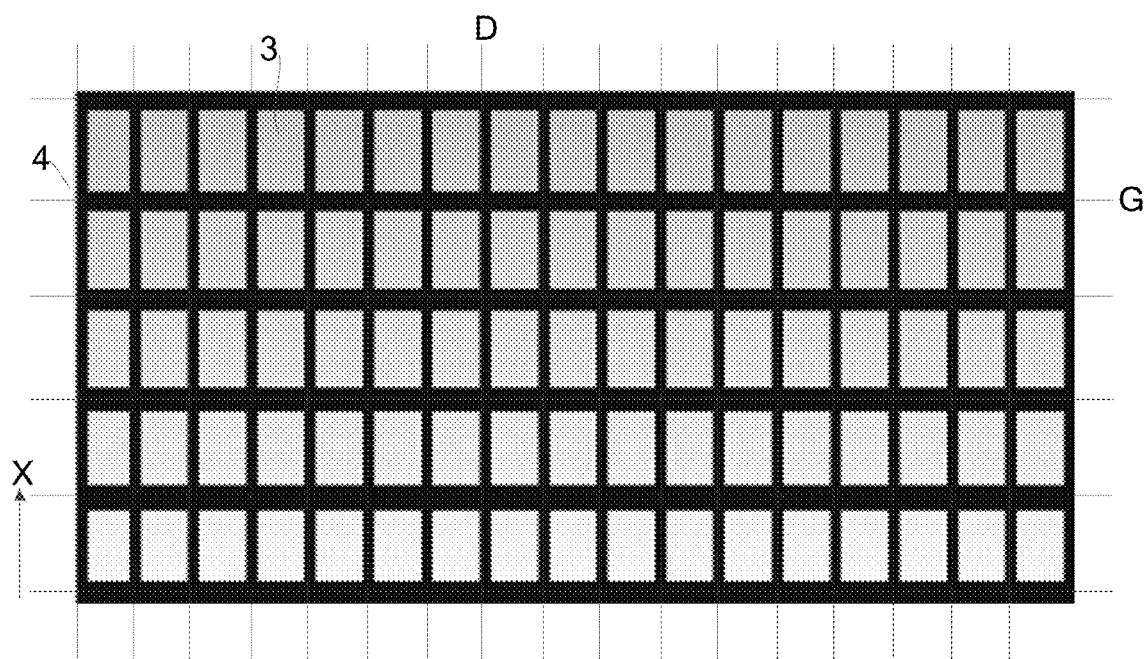
FIG. 6 is a schematic structural diagram of a display panel according to an embodiment of the present disclosure.

In the embodiments of the present disclosure, FIG. 6 is one of the schematic structural diagrams of the display panel. The display region A includes data lines D and gate lines G disposed crosswise.

The binding region C is disposed on one side of an extending direction of the data lines D, and a width of a portion, for shielding the gate lines G, in each light-shielding part 4 in the extending direction of the data lines D tends to decrease.

In the implementation process, when the display region A, the non-display region B and the binding region C are distributed according to the positions shown in FIG. 3, that is, the binding region C is disposed on one side of the extending direction of the data lines D, the light-shielding parts 4 may be disposed as shown in FIG. 6. The width of the portion, for shielding the gate lines G, in each light-shielding part 4 in the extending direction of the data lines D tends to decrease. As shown in FIG. 6, the width of the portion, for shielding the gate lines G, in each light-shielding part 4 in the extending direction of the data lines D tends to decrease line by line in the direction from the binding region C to the display region A. For example, a width of a light-shielding part 4 at a distance z1 from the binding region C is w1, and a width of a light-shielding part 4 at a distance z2 from the binding region C is w2, where z1<z2 and w1>w2, in this way, the design that the areas of the pixel aperture regions tend to increase in the direction from the binding region C to the display region A is guaranteed, thereby ensuring the picture uniformity.

Figure 7:
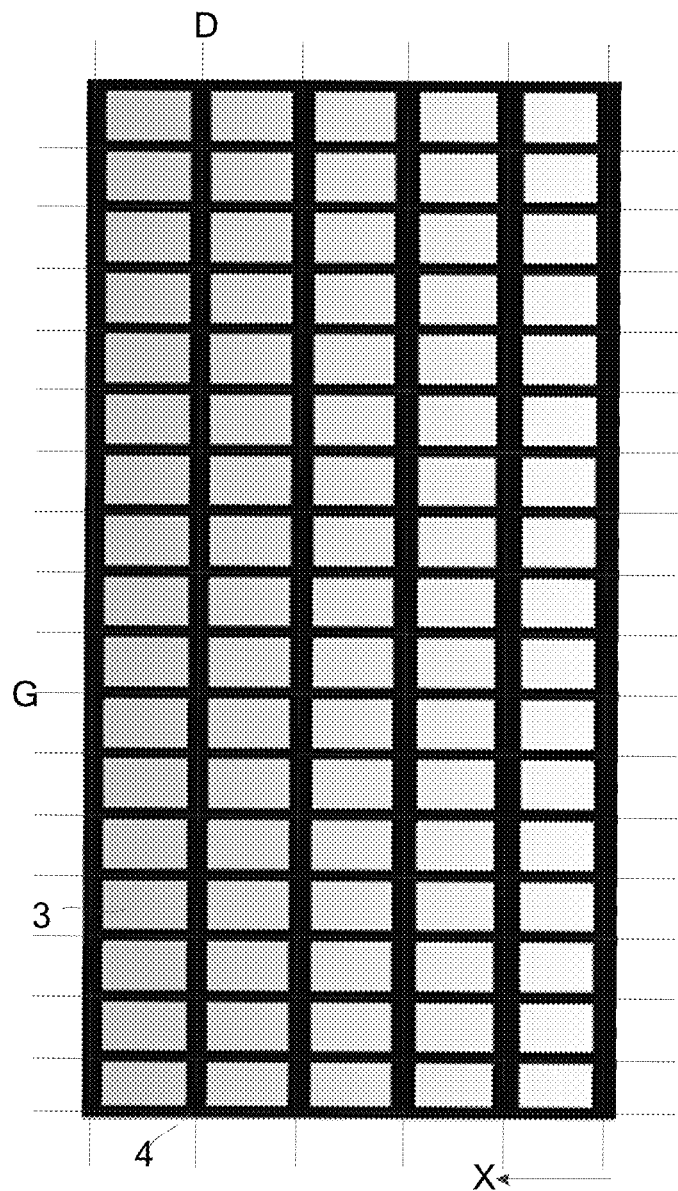
FIG. 7 is a schematic structural diagram of a display panel according to an embodiment of the present disclosure.

In the embodiments of the present disclosure, FIG. 7 is one of the schematic structural diagrams of the display panel. The display region A includes data lines D and gate lines G disposed crosswise.

The binding region C is disposed on one side of an extending direction of the gate lines G, and a width of a portion, for shielding the data lines D, in each light-shielding part 4 in the extending direction of the gate lines G tends to decrease.

In the implementation process, when the display region A, the non-display region B and the binding region C are distributed according to the positions shown in FIG. 4, that is, the binding region C is disposed on one side of the extending direction of the gate lines G, the light-shielding parts 4 may be disposed as shown in FIG. 7. The width of the portion, for shielding the data lines D, in each light-shielding part 4 in the extending direction of the gate lines G tends to decrease. As shown in FIG. 7, the width of the portion, for shielding the data lines D, in each light-shielding part 4 in the extending direction of the gate lines G tends to decrease line by line in the direction from the binding region C to the display region A. In this way, the design that the areas of the pixel aperture regions tend to increase in the direction from the binding region C to the display region A is guaranteed, thereby ensuring the picture uniformity.

In the embodiments of the present disclosure, in a direction perpendicular to the direction from the binding region C to the display region A, the light-shielding parts 4 of the sub-pixels have the same width.

In the implementation process, still referring to FIG. 5, in the direction perpendicular to the direction from the binding region C to the display region A, the light-shielding parts 4 of the sub-pixels have the same width. In this way, a manufacturing process for patterns of the light-shielding parts 4 is simplified, and the manufacturing cost of the display panel is reduced.

Figure 8:
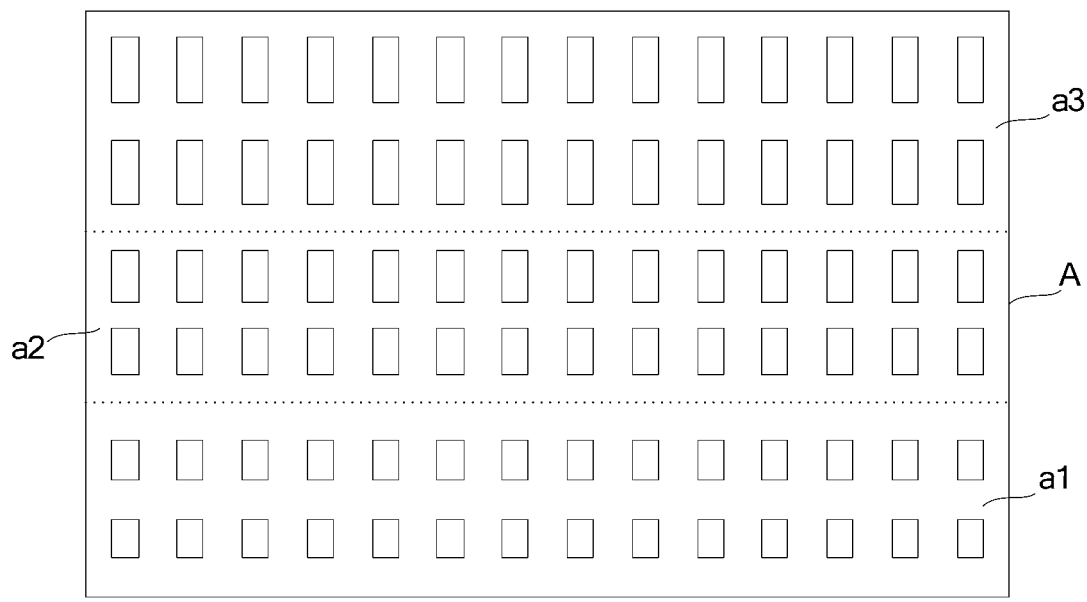
FIG. 8 is a schematic structural diagram of a display panel according to an embodiment of the present disclosure.

In the embodiments of the present disclosure, FIG. 8 is one of the schematic structural diagrams of the display panel. The display region A is divided into a plurality of sub-display regions in a direction of the binding region C facing away from the display region A, pixel aperture regions of sub-pixels in the same sub-display region have the same area, and areas of pixel aperture regions in different sub-display regions gradually increase in the direction from the binding region to the display region.

In the implementation process, the display region A is divided into the plurality of sub-display regions in the direction of the binding region C facing away from the display region A, and the quantity of the plurality of sub-display regions may be determined according to a size of the display panel. The display region may be divided equally in the direction of the binding region C facing away from the display region A, or may be divided according to other conditions, which is not limited here. The pixel aperture regions of the sub-pixels in the same sub-display region have the same area, so as to ensure the uniformity of display in the same sub-display region. The areas of pixel aperture regions in different sub-display regions gradually increase in the direction from the binding region C to the display region A. As shown in FIG. 8, the display region A is divided into three sub-display regions a1, a2 and a3 in the direction of the binding region C facing away from the display region A. In the sub-display region a1, an area of a pixel aperture region of each sub-pixel is S1; in the sub-display region a2, an area of a pixel aperture region of each sub-pixel is S2; and in the sub-display region a3, an area of a pixel aperture region of each sub-pixel is S3, where S1<S2<S3. In this way, while ensuring the display uniformity in the same sub-display region, the design that the areas of the pixel aperture regions tend to increase in the direction from the binding region C to the display region A, thereby ensuring the picture uniformity.

Figure 9:
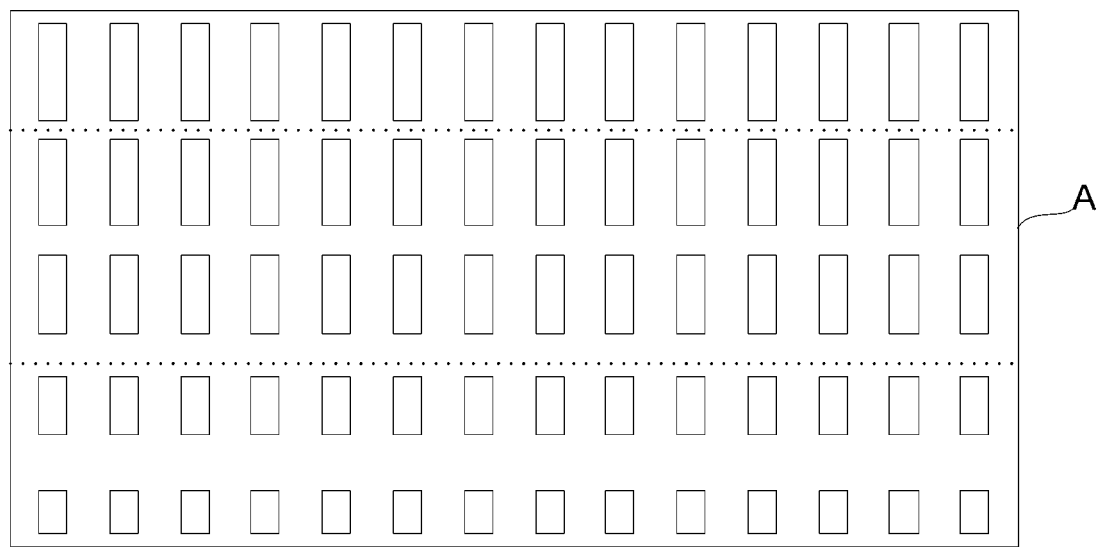
FIG. 9 is a schematic structural diagram of a display panel according to an embodiment of the present disclosure.

In the embodiments of the present disclosure, FIG. 9 is one of the structural schematic diagrams of the display panel. The display region A is divided into a plurality of sub-display regions in a direction of the binding region C facing away from the display region A, and areas of pixel aperture regions of sub-pixels in the same sub-display region gradually increase in the direction from the binding region to the display region.

In the implementation process, in addition to designing the areas of pixel aperture regions in different sub-display regions in a mode as shown in FIG. 8, the areas of pixel aperture regions in different sub-display regions may also be designed in a mode as shown in FIG. 9. The areas of the pixel aperture regions of the sub-pixels in the same sub-display region gradually increase in the direction from the binding region C to the display region A, so as to ensure gradually smooth transition of the areas of the pixel aperture regions in each line in the same sub-display region, and avoid poor display quality due to a large difference between areas of pixel aperture regions of two lines of sub-pixels, thereby ensuring display uniformity.

Figure 10:
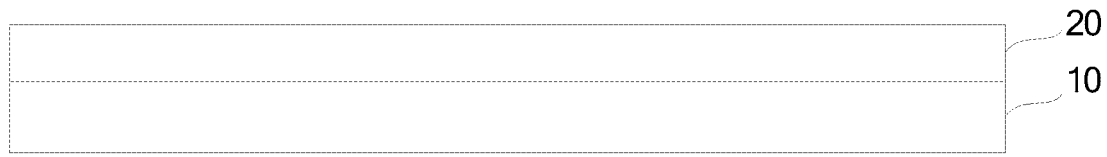
FIG. 10 is a schematic structural diagram of a display device according to an embodiment of the present disclosure.

Based on the same disclosure concept, as shown in FIG. 10, embodiments of the present disclosure further provide a display device. The display device includes:

a backlight module 10; and the display panel 20 as described above, located on a light-emitting side of the backlight module 10.

In an implementation process, the display panel 20 may be a liquid crystal display panel, and the liquid crystal display panel may be a display panel in an advanced super dimension switch (ADS) mode. In addition, the backlight module 10 may be a design in the related art, which will not be described in detail here. Moreover, the principle of solving the problem of the display device is similar to that of the above display panel 20. Therefore, the implementation of the display device may refer to the implementation of the above display panel 20, which will not be repeated here.

In the implementation process, the display device provided by the embodiments of the present disclosure may be a television set as shown in FIG. 10, and of course, the display device provided by the embodiments of the present disclosure may also be a mobile phone, a tablet computer, a display, a notebook computer, a digital photo frame, a navigator and any other product or component with a display function. Other essential components of the display device should be understood by those ordinarily skilled in the art, and will not be repeated here, nor should they be used as a limitation of the present disclosure.

Figure 11:
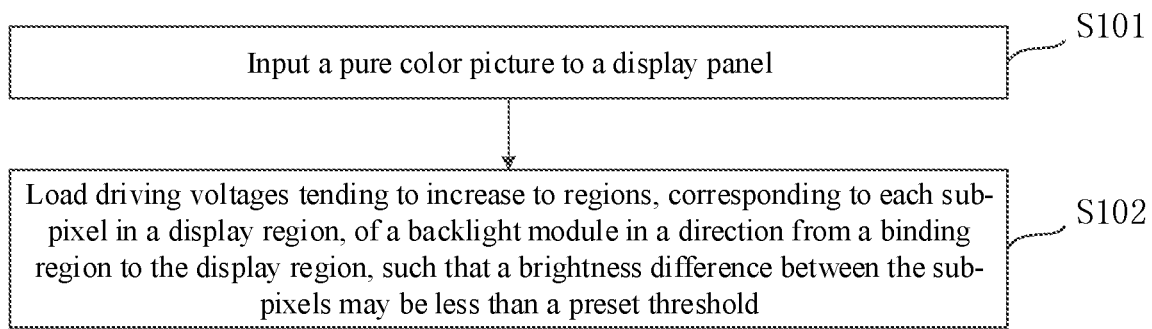
FIG. 11 is a flowchart of a debugging method of the display device shown in FIG. 10.

Based on the same disclosure concept, as shown in FIG. 11, embodiments of the present disclosure further provide a debugging method of a display device as shown in FIG. 10, including the following steps.

S101: a pure color picture is input to a display panel.

S102: driving voltages tending to increase are loaded to regions, corresponding to each sub-pixel in a display region, of a backlight module in a direction from a binding region to the display region, such that a brightness difference between the sub-pixels may be less than a preset threshold.

In the implementation process, the implementation process of step S101 to step S102 is as follows.

First, the pure color picture is input to the display panel. The pure color picture may be a pure color picture with the highest gray scale, for example, a pure green picture with a gray scale of 255. Then, before the display panel displays the pure color picture, the driving voltages tending to increase are loaded to the regions, corresponding to each sub-pixel in the display region, of the backlight module 10 in the direction from the binding region to the display region, such that the brightness difference between the sub-pixels may be less than the preset threshold. The preset threshold may be a threshold of resolution of the human eye, and the human eye cannot distinguish the brightness difference between two sub-pixels. An example is given below to illustrate the setting of the driving voltages. For example, a distance between a sub-pixel sp1 and the binding region C is d1, a distance between a sub-pixel sp2 and the binding region C is d2, a driving voltage loaded to a region, corresponding to the sub-pixel sp1, in the backlight module is V1, and a driving voltage loaded to a region, corresponding to the sub-pixel sp2, in the backlight module 10 is V2, where d1<d2 and V1<V2, thereby weakening the negative impact of the resistance-capacitance loading at the corresponding position of the sub-pixel sp2 being greater than the resistance-capacitance loading at the corresponding position of the sub-pixel sp1 on the picture uniformity, and ensuring the picture uniformity of the display panel. In addition, in addition to loading the driving voltages tending to increase to the regions, corresponding to each sub-pixel in the display region A, of the backlight module 10 in the direction from the binding region C to the display region A, the areas of the pixel aperture regions at the corresponding positions may also be set in a mode as shown in FIG. 3 to FIG. 9, so as to ensure the picture uniformity of the display device and the display quality to the greatest extent.

In the embodiments of the present disclosure, the display region A may also be divided into a plurality of sub-display regions in a direction of the binding region C facing away from the display region A. Step S102, that is, the driving voltages tending to increase are loaded to the regions, corresponding to each sub-pixel in the display region, of the backlight module 10 in the direction from the binding region to the display region, such that the brightness difference between the sub-pixels may be less than the preset threshold, includes:

gradually decreasing driving voltages are loaded to regions, corresponding to each sub-display region, of the backlight module 10 in the direction from the binding region to the display region.

Driving voltages loaded to regions, corresponding to the same sub-display region, of the backlight module are the same voltage.

In the implementation process, one of the plurality of sub-display regions may be used as a target sub-display region, and by loading the gradually increasing driving voltages to the regions, corresponding to each sub-display region, of the backlight module 10 in the direction from the binding region C to the display region A, the brightness of the other sub-display region(s) except the target sub-display region is adjusted until a brightness difference between the other sub-display region(s) and the target sub-display region is smaller than a preset threshold, thereby ensuring the uniformity of brightness among the sub-display regions, and ensuring the display quality of the display device. In addition, the same driving voltage is loaded to the regions, corresponding to the same sub-display region, in the backlight module 10, thereby simplifying the driving control over the regions, corresponding to the same sub-display region, in the backlight module 10, and reducing the cost for adjusting the picture uniformity.

Figure 12:
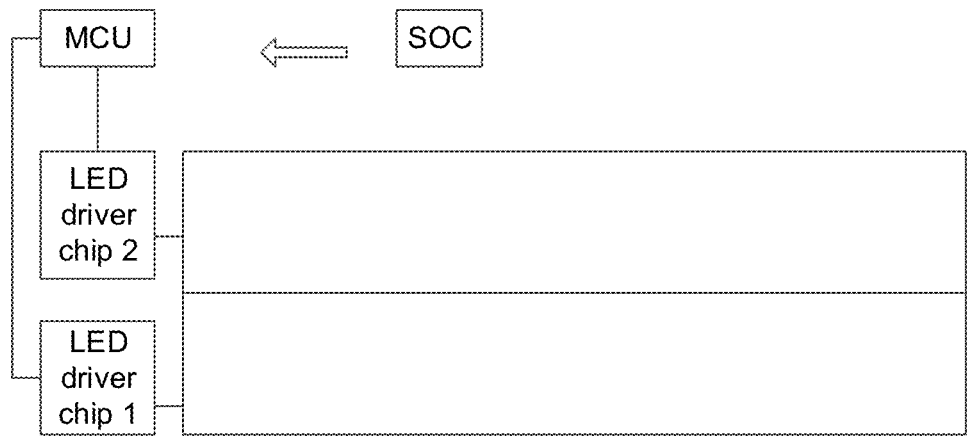
FIG. 12 is one of schematic structural diagrams of a backlight module of a display device according to an embodiment of the present disclosure.

In the implementation process, the backlight module 10 may use direct-type LED backlight, and realize compensation for backlight brightness of each sub-region by backlight local dimming, thereby realizing dimming on the display uniformity of a picture. FIG. 12 is one of schematic structural diagrams of the backlight module 10. As shown in FIG. 12, the backlight module 10 may include three parts: a system on chip (SOC), a microcontroller unit (MCU) and LED driver chips. Signals output to LED driver chips in corresponding regions of the backlight module 10 are processed through the SOC and the MCU. By increasing a driving voltage and driving current of an LED driver chip facing away from the binding region C, the display brightness of the corresponding region position is improved. By decreasing a driving voltage and driving current of an LED driver chip close to the binding region C, the display brightness of the corresponding region position is reduced. Thus, the display uniformity of a picture is ensured. FIG. 12 shows a case where the display region A is divided into two sub-regions, signals of the backlight module 10 and an LED driver chip 1 corresponding to one sub-region, as well as signals of the backlight module 10 and an LED driver chip 2 corresponding to the other sub-region are processed through the SOC and the MCU. Of course, in practical applications, driving voltages and driving currents of LED driver chips in corresponding sub-regions may also be controlled according to the actual partition situation of the display region A, which will not be described in detail here.

In addition, in the embodiments of the present disclosure, the display region A is divided into a plurality of sub-display regions in a direction facing away from the binding region C. Simulation may be performed according to data such as backlight brightness, pixel aperture ratio, and transmittance to obtain the relationship between the display brightness and a screen position. Then, the display panel in the display device is divided in the direction of the display region A facing away from the binding region C (which may be an extending direction of data lines D) according to the relevant simulation data. A brightness difference between two adjacent sub-regions being less than the resolution of the human eye is taken as the benchmark, such that no obvious partition difference is caused. If the minimum resolution brightness of the human eye in a certain brightness interval is $\Delta L$, and a difference between the brightness of a sub-pixel, closest to the binding region C, in the display region A and the brightness of a sub-pixel, farthest from the binding region C, in the display region A is L, the quantity of sub-regions may be $N \geq L/\Delta L + 1$, that is, the brightness difference in the display region A determines the quantity of sub-regions.

Figure 13:
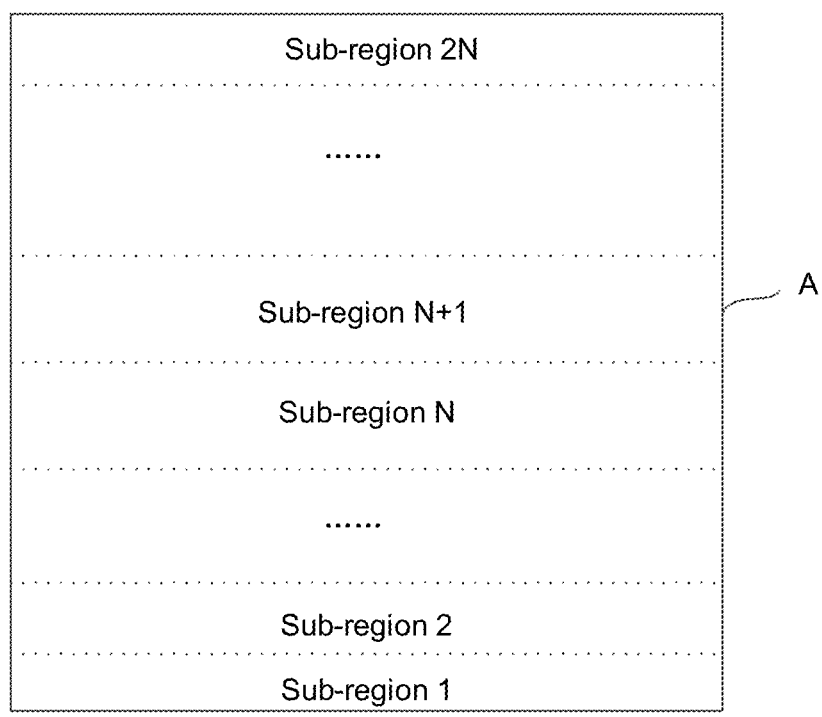
FIG. 13 is one of schematic diagrams of sub-regions of a display region in a display device according to an embodiment of the present disclosure.

In the implementation process, after the display region A is divided into the plurality of sub-display regions, as shown in FIG. 13, brightness compensation design may be performed on adjacent sub-regions with simulated brightness data of the position of a middle sub-region N in the plurality of sub-display regions as the benchmark. Based on the corresponding relationship between the display brightness and the areas of the pixel aperture regions, which is generally a linear corresponding relationship, the display brightness of sub-regions (for example, a region N−1, a region N−2, . . . , a region 1) close to the binding region C may be reduced relative to the middle sub-region N, for example, areas of pixel aperture regions of the sub-regions close to the binding region C are decreased relative to an area of a pixel aperture region of the middle sub-region N; and the display brightness of sub-regions (for example, a region N+1, a region N+2, . . . , a region 2N) facing away from the binding region C may be improved relative to the middle sub-region N, for example, areas of pixel aperture regions of the sub-regions facing away from the binding region C are increased relative to the area of the pixel aperture region of the middle sub-region N, thereby ensuring consistency of the display brightness of each sub-region in the display region A, ensuring the picture uniformity, and improving the display quality.

In the process of making the display panel as shown in FIG. 3, the area of the pixel aperture region in each region may be adjusted by changing a mask. For example, a display substrate in the display panel adopts the design of uniform aperture ratio of sub-pixels, and corresponding masks are used for black matrixes in an opposite substrate, opposite to the display substrate, in the display panel according to the area requirements of the pixel aperture regions of the sub-pixels in each region. The masks may be masks with a line width of light-shielding parts 4 close to the binding region C being large, and a line width of light-shielding parts 4 away from the binding region C being small, thereby realizing targeted adjustment of the areas of the pixel aperture regions of the sub-pixels at different positions.

Moreover, in the implementation process, the areas of the pixel aperture regions of the sub-pixels at different positions in the display panel may also be adjusted by adjusting other process conditions. For example, by controlling the temperature of a curing machine, curing temperatures of different positions, and the corresponding relationship between the curing degree of a color filter material in the opposite substrate and the line width, adjustment of the width of the light-shielding parts 4 is achieved, and finally adjustment of the areas of the pixel aperture regions of the sub-pixels is achieved. In addition, when the display region A is divided into the plurality of sub-display regions, the width of the light-shielding parts 4 may also be adjusted by controlling process conditions such as exposure intensity, exposure amount, and development of different sub-regions. Taking the curing temperature as an example, the temperature of each part of the curing machine may be controlled by zone, and for a sub-display region needing a large area of a pixel aperture region, the curing temperature of the machine is reduced, thereby decreasing the width of the light-shielding parts 4. Of course, corresponding process conditions may also be used to adjust the area of the pixel aperture region of each sub-pixel according to actual application requirements, which will not be described in detail here.

Although preferred embodiments of the present disclosure have been described, those skilled in the art, once armed with the basic inventive concepts, can make additional alterations and modifications to these embodiments. Therefore, it is intended that the appended claims be interpreted as including the preferred embodiments and all alterations and modifications that fall within the scope of the present disclosure.

It will be apparent to those skilled in the art that various modifications and variations can be made in the present application without departing from the spirit or scope of the present application. Thus, it is intended that the present application cover these modifications and variations of the present application provided they come within the scope of the appended claims of the present application and their equivalents.

What is claimed is:

1. A display panel, comprising:
   a base substrate, comprising:
     a display region; and
     a non-display region surrounding the display region;
     wherein the non-display region comprises a binding region on one side of the display region; and
   a plurality of sub-pixels, in the display region;
   wherein areas of pixel aperture regions of the plurality of sub-pixels tend to increase in a direction from the binding region to the display region;
   the display region is divided into a plurality of sub-display regions in the direction from the binding region to the display region;
   areas of pixel aperture regions of sub-pixels in a same sub-display region are same; and
   areas of pixel aperture regions of sub-pixels in different sub-display regions gradually increase in the direction from the binding region to the display region.

2. The display panel according to claim 1, wherein a region occupied by each of the plurality sub-pixels comprises:
   the pixel aperture region; and
   a light-shielding region surrounding the pixel aperture region;
   wherein areas of the regions occupied by the respective sub-pixels are same;
   a color filter is disposed in the pixel aperture region;
   a light-shielding part is disposed in the light-shielding region; and
   in the direction from the binding region to the display region, widths of the light-shielding parts of the plurality of sub-pixels tend to decrease.

3. The display panel according to claim 2, wherein the display region comprises data lines and gate lines disposed crosswise; and
   the binding region is disposed on one side of an extending direction of the data lines, and in the direction from the binding region to the display region, widths of portions, for shielding the gate lines, in the light-shielding parts in the extending direction of the data lines tend to decrease.

4. The display panel according to claim 2, wherein the display region comprises data lines and gate lines disposed crosswise; and
   the binding region is disposed on one side of an extending direction of the gate lines, and in the direction from the binding region to the display region, widths of portions, for shielding the data lines, in the light-shielding parts in the extending direction of the gate lines tend to decrease.

5. The display panel according to claim 2, wherein in a direction perpendicular to the direction from the binding region to the display region, widths of the light-shielding parts of the sub-pixels are same.

6. A display device, comprising:
   a backlight module; and
   the display panel according to claim 1;
   wherein the display panel is on a light-emitting side of the backlight module.

7. A debugging method of the display device according to claim 6, comprising:
   inputting a pure color picture to the display panel; and
   loading driving voltages tending to increase to regions, corresponding to the sub-pixels in the display region, of the backlight module in the direction from the binding region to the display region, such that a brightness difference between the sub-pixels is less than a preset threshold.

8. The debugging method according to claim 7, wherein said loading the driving voltages tending to increase to the regions, corresponding to the sub-pixels in the display region, of the backlight module in the direction from the binding region to the display region, comprises:
   loading gradually increasing driving voltages to regions, corresponding to the sub-display regions, of the backlight module in the direction from the binding region to the display region;
   wherein driving voltages loaded to regions, corresponding to a same sub-display region, of the backlight module are same.

9. A display panel, comprising:
   a base substrate, comprising:
     a display region; and
     a non-display region surrounding the display region;
     wherein the non-display region comprises a binding region on one side of the display region; and
   a plurality of sub-pixels, in the display region;
   wherein areas of pixel aperture regions of the plurality of sub-pixels tend to increase in a direction from the binding region to the display region;
   the display region is divided into a plurality of sub-display regions in the direction from the binding region to the display region;
   areas of pixel aperture regions of sub-pixels in a same sub-display region gradually increase in the direction from the binding region to the display region; and
   areas of pixel aperture regions of sub-pixels in different sub-display regions gradually increase in the direction from the binding region to the display region.

10. The display panel according to claim 9, wherein a region occupied by each of the plurality sub-pixels comprises:
    the pixel aperture region; and
    a light-shielding region surrounding the pixel aperture region;
    wherein areas of the regions occupied by the respective sub-pixels are same;
    a color filter is disposed in the pixel aperture region;
    a light-shielding part is disposed in the light-shielding region; and
    in the direction from the binding region to the display region, widths of the light-shielding parts of the plurality of sub-pixels tend to decrease.

11. The display panel according to claim 10, wherein the display region comprises data lines and gate lines disposed crosswise; and
    the binding region is disposed on one side of an extending direction of the data lines, and in the direction from the binding region to the display region, widths of portions, for shielding the gate lines, in the light-shielding parts in the extending direction of the data lines tend to decrease.

12. The display panel according to claim 10, wherein the display region comprises data lines and gate lines disposed crosswise; and the binding region is disposed on one side of an extending direction of the gate lines, and in the direction from the binding region to the display region, widths of portions, for shielding the data lines, in the light-shielding parts in the extending direction of the gate lines tend to decrease.

13. The display panel according to claim 10, wherein in a direction perpendicular to the direction from the binding region to the display region, widths of the light-shielding parts of the sub-pixels are same.

14. A display device, comprising:

a backlight module; and the display panel according to claim 9;

wherein the display panel is on a light-emitting side of the backlight module.

15. A debugging method of the display device according to claim 14, comprising:

inputting a pure color picture to the display panel; and loading driving voltages tending to increase to regions, corresponding to the sub-pixels in the display region, of the backlight module in the direction from the binding region to the display region, such that a brightness difference between the sub-pixels is less than a preset threshold.

\* \* \* \* \*